United States Patent [19]
Kolin

[11] 3,773,037
[45] Nov. 20, 1973

[54] SIMPLIFIED EXTERNAL FIELD ELECTROMAGNETIC CATHETER FLOW METER

[75] Inventor: Alexander Kolin, Bel Air, Calif.

[73] Assignee: The Regents of the University of California, Berkeley, Calif.

[22] Filed: Nov. 27, 1972

[21] Appl. No.: 309,825

Related U.S. Application Data

[63] Continuation of Ser. No. 32,671, April 28, 1970, abandoned, which is a continuation-in-part of Ser. No. 16,175, March 3, 1970, abandoned.

[52] U.S. Cl............................ 128/2.05 F, 73/194 EM
[51] Int. Cl................................................ A61b 5/02
[58] Field of Search................. 128/2.05 R, 2.05 F, 128/2.05 V, 404, 417, 418; 73/194, 194 EM

[56] References Cited
UNITED STATES PATENTS

| | | | |
|---|---|---|---|
| 452,220 | 5/1891 | Gunning | 128/408 |
| 870,927 | 11/1907 | Boyd | 128/407 |
| 3,516,412 | 6/1970 | Ackerman | 128/418 |
| 3,605,726 | 9/1971 | Williams et al. | 128/2.05 F |
| 3,405,708 | 10/1968 | Webster, Jr. | 128/2.05 F |
| 3,347,224 | 10/1967 | Adams | 128/2.05 F |
| 3,359,974 | 12/1967 | Khalil | 128/2.05 F |
| 3,516,399 | 6/1970 | Barefoot | 128/2.05 F |

OTHER PUBLICATIONS

Pieper, H. P., "The Review of Scientific Instr." Vol. 29, No. 11, Nov. 1958, pp 965–967.
Kolin, A., Physiology, Vol. 57, 1967, pp. 1331–1337.
Kolin, A. Science, Vol. 130, Oct. 1959, pp. 1088–1097.
Chedd, G., New Scientist, 13 July 1967, pp. 72–74.

Primary Examiner—Kyle L. Howell
Attorney—Warren T. Jessup et al.

[57] ABSTRACT

An electromagnetic catheter-type flow meter is provided which may be introduced, for example, into a blood vessel to measure the blood flow in the blood vessel, and which is constructed to have a minimal diameter so that it may be introduced percutaneously, for example, into a branch of a larger blood vessel with minimum damage. The flow meter of the invention is angulated so as to place its pick-up electrodes adjacent the inner surface of the wall of the blood vessel diagonally or diametrically across the blood vessel from one another; or the catheter may be rigid and straight, and/or pointed as a needle, so that it may be introduced transversely into a blood vessel through a branch vessel or through the wall thereof.

11 Claims, 10 Drawing Figures

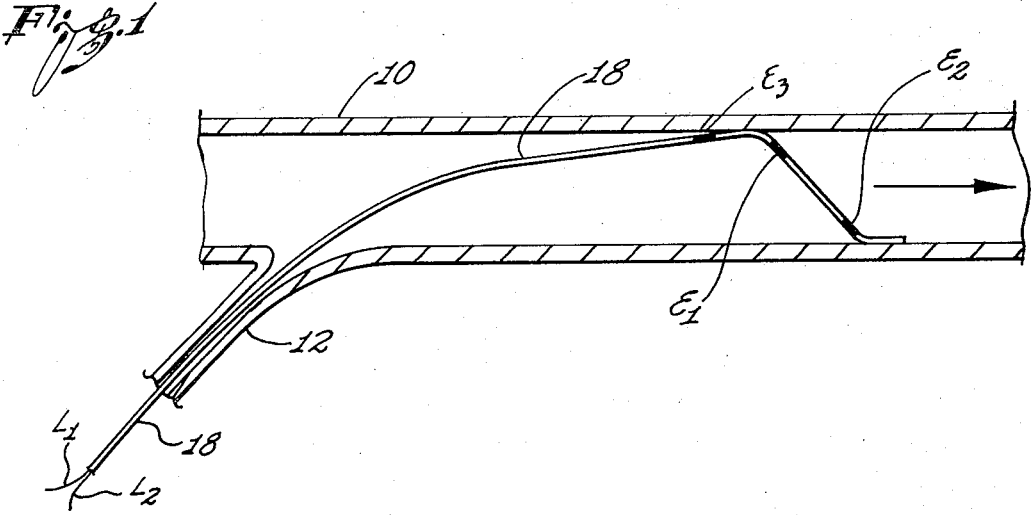
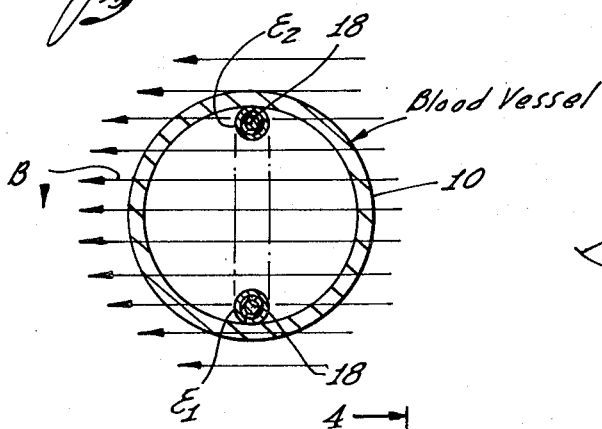
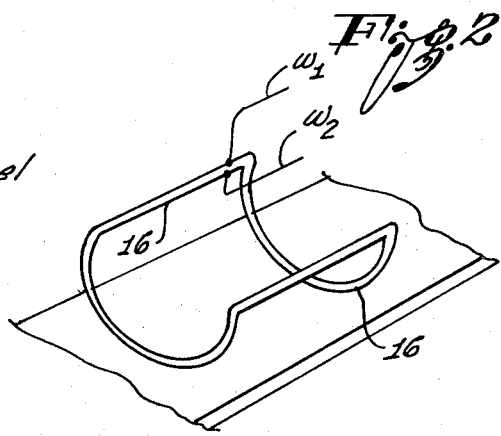
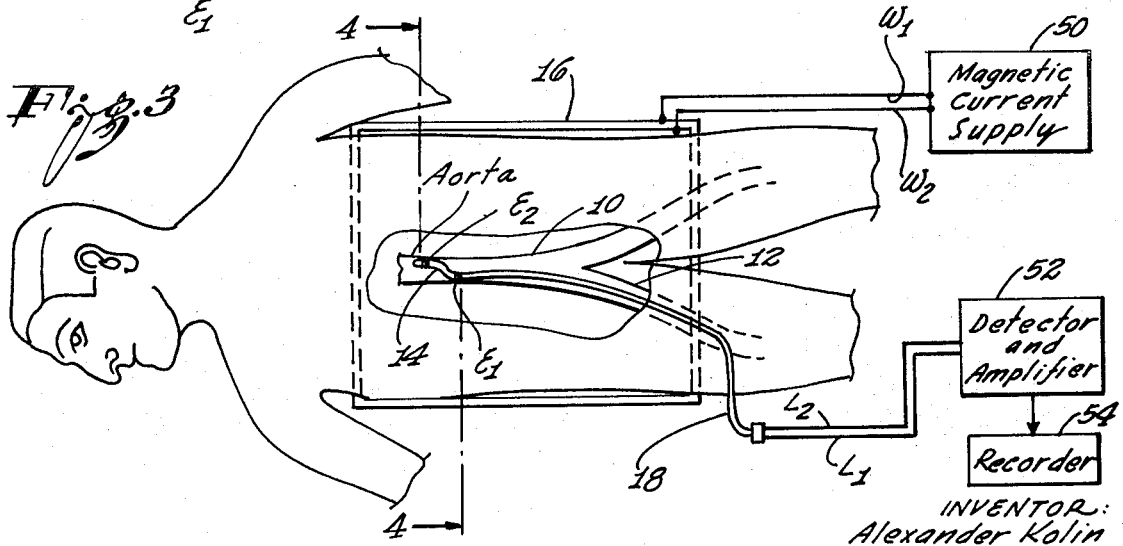
INVENTOR:
Alexander Kolin
Jessup and Beecher
By Warren T. Jessup
ATTORNEYS

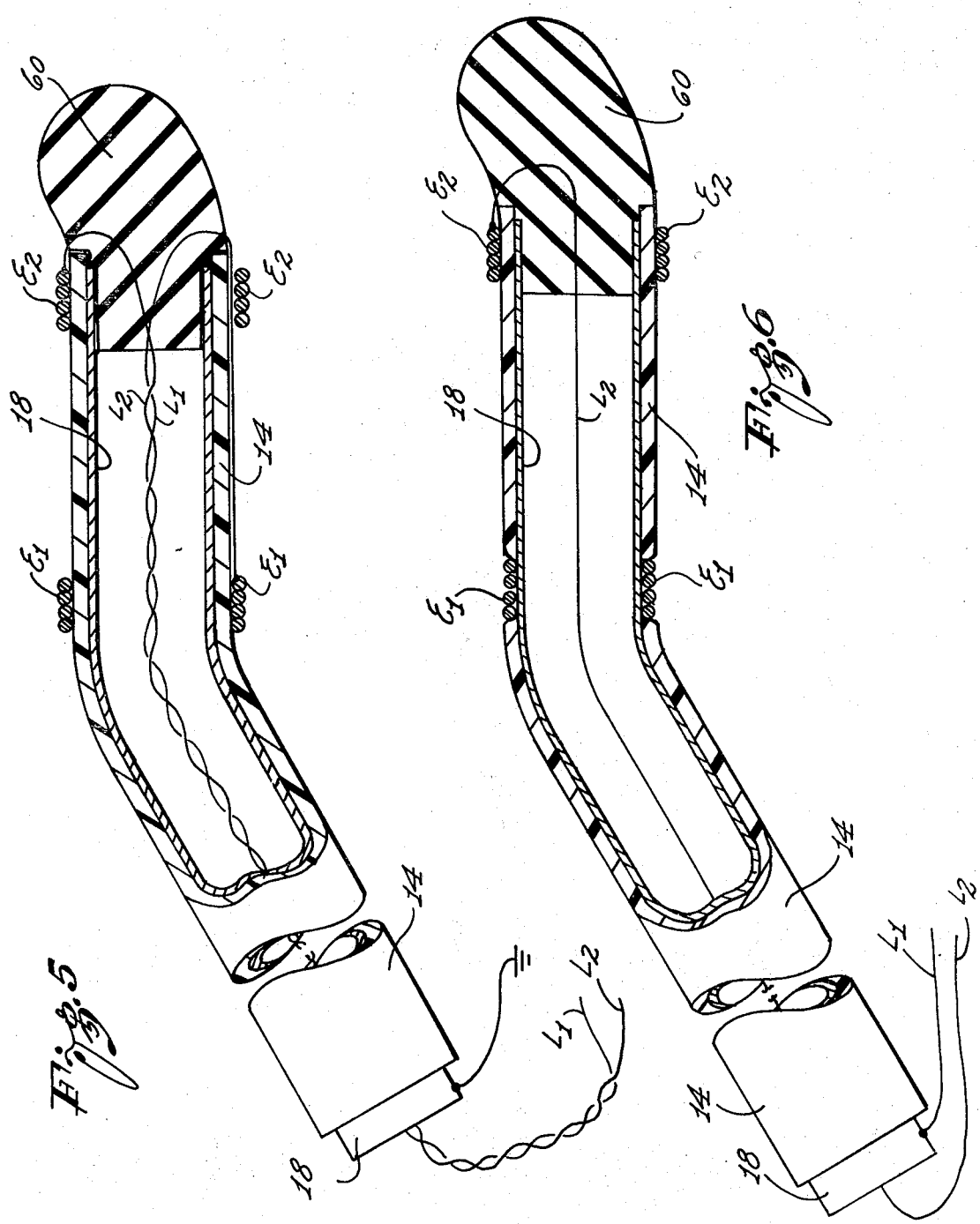

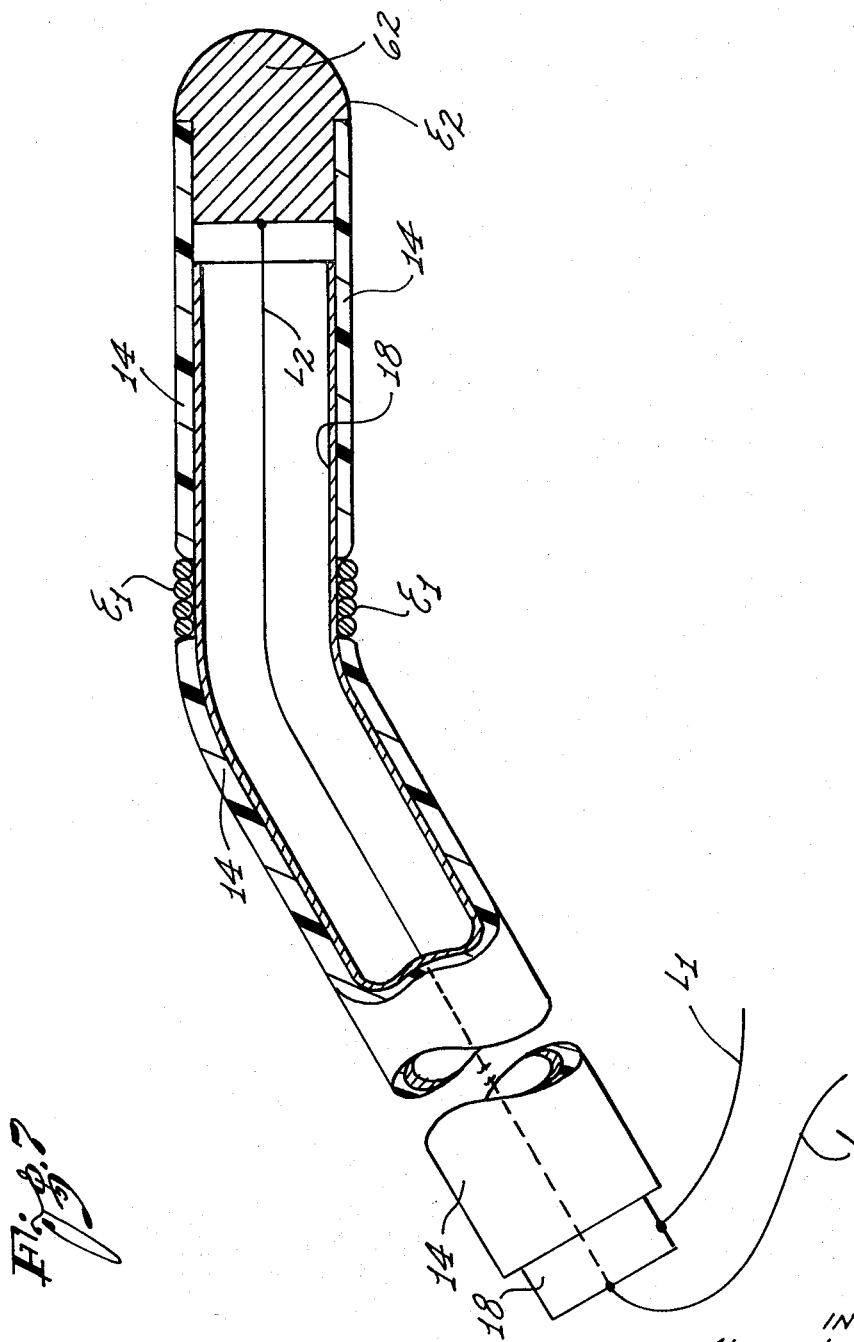

INVENTOR.
Alexander Kolin
Warren T. Jessup
ATTORNEYS

SIMPLIFIED EXTERNAL FIELD ELECTROMAGNETIC CATHETER FLOW METER

This is a continuation of application Ser. No. 32,671 filed Apr. 28, 1970, now abandoned, which was a continuation-in-part of application Ser. No. 16,175, filed Mar. 3, 1970, now abandoned.

BACKGROUND OF THE INVENTION

Electromagnetic flow meters include means for producing a magnetic field across the path of a moving fluid, so that a voltage is generated as the fluid moves through the field. This voltage is directly proportional to the average velocity of the fluid. Electromagnetic flow meters are provided with a pair of pick-up electrodes disposed across a moving fluid stream and which are held in contact with the moving fluid, so that the voltage induced in the fluid may be measured, and the resulting voltage may be utilized to determine the velocity of the fluid. When the pick-up electrodes span the entire fluid stream in a circular conduit, for example, a true flow meter is provided because the voltage generated is proportional to the average velocity of the fluid through the conduit. However, when the electrodes span only a small portion of the fluid stream, a so-called velometer is provided, and its measurements are accurate only if the velocity of the fluid across the entire cross-section of the conduit is the same.

The electromagnetic catheter-type flow meter to be described is of the same general type as described, for example, in Copending application Ser. No. 873,240, which was filed Nov. 3, 1969 in the name of the present inventor and now abandoned. However, whereas the copending application describes an electromagnetic catheter-type flow meter, which is collapsible in order to achieve a minimal transverse dimension for insertion into the interior of the blood vessel, the flow meter of the present invention may be elongated to a linear configuration of minimal diameter, so that it may expeditiously be inserted into the blood vessel. Once in the blood vessel, the resilient nature of the flow meter of the invention causes it to assume an S-shape or Γ-shape, or angular configuration, as will be described, so that it may perform its flow meter function.

As mentioned in the aforesaid copending application, the volume rate of blood flow may be determined quantitatively by an electromagnetic flow meter applied externally to a blood vessel, as described, for example, in an article by Alexander Kolin in the O. Glasser Edition Medical Physics 3 141/155, 160. Such an application, however, requires exposure of the blood vessel and usually involves extensive surgery. Such surgery is often undesirable, and especially so if routine use is to be made of flow meters for clinical measurements of blood flow in the blood vessels of patients.

In order to overcome the limitations of the prior art electromagnetic flow meters such as described in the preceding paragraph, catheter-type flow meters have been developed which comprise an electromagnetic flow transducer incorporated into a thin catheter-type tube, and which may be inserted into a branch blood vessel, such as the femoral artery or femoral vein, from which it may be maneuvered into a major artery, such as the aorta or pulmonary artery; or vein, such as the vena cava. The catheter-type electromagnetic flow meter referred to above is described, for example, by C. J. Mills, Phys. Med. Vol. 11, 323 (1966); and by Alexander Kolin et al., in the Proceedings National Academy of Sciences, 59, 808 (1968).

However, the catheter-type flow meters described in the aforesaid publications are typically from 3 to 4 millimeters in a diameter, and require larger openings in the blood vessel than would be normally considered safe, and such flow meters do not lend themselves practically for percutaneous introduction through small openings in the skin of the patient.

The aforesaid copending application, as well as Copending application Ser. No. 874,094, filed Nov. 3, 1969 in the name of the present inventor and now abnadoned, describe improved catheter-type electromagnetic flow meters in which the problem of excessive dimensions is solved, and which are constructed to comprise a transversely collapsible frame which may be restricted in a transverse direction to a narrow configuration. This permits the catheters described in the patent applications to be introduced percutaneously, for example, into the blood vessel of a patient.

As mentioned above, the improved catheter-type flow meter of the present invention is similar to the instrument described in the Copending application Ser. No. 873,240, except that instead of providing a collapsible type unit, a minimal diameter is achieved for the instrument of the present invention so as to permit insertion into the patient percutaneously, by constructing the instrument to be resilient and to be capable of being straightened to a linear configuration while passing through a tube. The instrument of the invention may then be introduced into the blood vessel of the patient percutaneously, for example, through a tubular catheter, and the instrument assumes its angulated shape after it emerges from the inner end of the catheter and into the blood vessel under examination, so as to displace its pick-up electrodes to the opposite side of the blood stream within the blood vessel.

The preferred technique of introducing the flow probe catheter is through a hollow catheter tube which, in turn, is passed through a hollow needle, the latter being used to puncture the skin and muscle. The hollow catheter terminates in the blood vessel at the point where the emerging probe is to measure the fluid flow. Then, as the probe emerges from the tubular catheter within the blood vessel, its resilient characteristics cause it to angulate and assume the desired configuration for proper flow meter operation.

As mentioned above, the flow meter of the invention is angulated so as to place its pick-up electrodes adjacent the inner surface of the wall of the blood vessel diagonally across the blood vessel from one another, or preferably diametrically across from one another, thus functioning as a true flow meter; or it may space the electrodes diagonally or diametrically across a part of the blood vessel lumen so as to function as a velometer. The flow meter to be described is in the form of an elongated resilient means, as mentioned above, which may have a linear configuration and minimal diameter when inserted into the aforesaid blood vessel through a tubular catheter, but which assumes an S-shape, or a Γ-shape, or other angular shape, as it emerges from a blood vessel branch, or from the inner end of the tubular catheter and into the blood vessel. This permits the electrodes of the flow meter to be displaced diagonally or diametrically from one another for proper flow meter measurements. A magnetic field may be established within the blood vessel from an external means, such as an electric current carrying coil.

For example, as was the case with the flow meter of the Copending application Ser. No. 873,240, the magnetic field may be established within the blood vessel by an electric current carrying coil, or other type of magnet, disposed externally of the patient. The catheter flow meter of the present invention, therefore, is essentially a linear-type when inserted into the patient through a tubular catheter, but one which is capable of resilient deformation to set itself into an angular shape when positioned within the blood vessel, so as to displace its pick-up electrodes diagonally or diametrically across the blood stream in the blood vessel, and preferably so that the line joining the electrodes is perpendicular to the flow and lies as nearly as possible in a plane perpendicular to the magnetic field.

As a further embodiment, the catheter may be straight, for insertion through a perpendicular branch, or rigid and pointed as a needle for insertion through the skin and muscle of the patient, and with the pick-up electrodes positioned at spaced locations along its length. The catheter may in the latter case, then be inserted with its point piercing the skin and muscle of the patient so as to be introduced transversely into an artery, for example. Fluoroscopy may be used for the insertion of the latter embodiment. It is clear that if the catheter is sufficiently thin, no danger of bleeding will occur.

BRIEF DESCRIPTION OF THE DRAWINGS

FIG. 1 is a somewhat schematic representation of an electromagnetic catheter-type flow meter constructed in accordance with the concepts of the present invention, and illustrated as being inserted into a blood vessel through a smaller branch blood vessel;

FIG. 2 is a perspective representation of one embodiment of an external coil which may be used to establish a magnetic field within the blood vessel;

FIG. 3 is a schematic representation of the flow meter of the present invention as inserted into a patient, and showing the external coil of FIG. 2 positioned around the patient, although the coil may be flat and parallel to the plane of the table and placed over or under the patient, and also showing in block form certain electrical components which may be associated with the flow meter;

FIG. 4 is a cross-sectional view taken essentially along the line 4—4 of FIG. 3, but on an enlarged scale, and showing the magnetic field which is established by the external coil and which traverses the blood vessel;

FIG. 5 is a side view, partly in section, showing one embodiment of the improved electromagnetic catheter flow meter of the present invention;

FIG. 6 is a side view, partly in section, showing a second embodiment of the flow meter;

FIG. 7 is a side view, partly in section, showing yet a further embodiment of the invention;

DETAILED DESCRIPTION OF THE ILLUSTRATED EMBODIMENT

Figure 8:
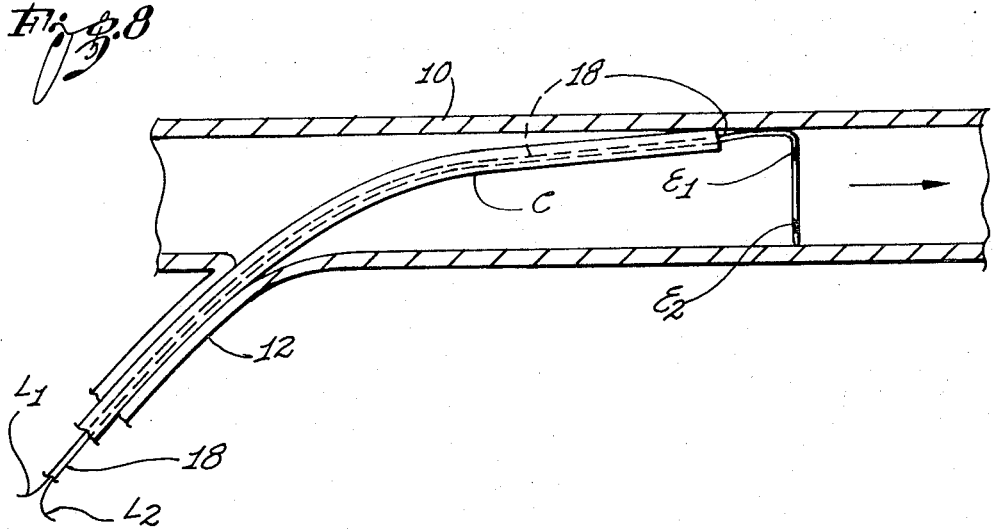
FIG. 8 is a cross-sectional view like FIG. 1, and showing the flow meter of FIG. 1 with the electrodes displaced diametrically across the blood vessel, instead of diagonally, and emerging from a tubular catheter inserted into the blood vessel.

In the representation of FIG. 1, the electromagnetic flow meter of the invention is illustrated as inserted into a conduit, such as a blood vessel 10, for example, through a branch blood vessel 12. The flow meter includes a resilient tubular member 18, through which a pair of electric leads or wires $L_1$ and $L_2$ extend, the leads being connected to a pair of electrodes $E_1$ and $E_2$. The leads $L_1$ and $L_2$ may be cooper wires, insulated by Teflon or other suitable insulating material, and they may be twisted or straight. The electrodes $E_1$ and $E_2$ are mounted on the tubular member 18 at spaced positions therealong, as shown. The electrodes $E_1$ and $E_2$ are insulated from the tubular member. The electrodes $E_1$ and $E_2$ may have any suitable form. For examle, they may be formed of metallic strips, or coils, or of metallic paste.

The flow meter illustrated in FIG. 1 may be originally straight, and the user may make the bend at the appropriate place so as to cause the flow meter to span any particular artery in which a measurement is to be made.

An insulating coating of, for example, Teflon or silicone rubber, or other appropriate material which preferably does not tend to coagulate the blood, is formed over the tubular member 18, and between the electrodes $E_1$ and $E_2$, this insulated coating being designated as 14 in the embodiment of FIGS. 4, 5 and 6. The tubular member 18 may, for example, be formed of a resilient metal, such as 18 or 20 gauge hypodermic stainless steel tubing. The tubular member 18, as mentioned above, can be originally straight to be bent by the user and be preformed so that it has the tendency to assume on angular, rectangular or S-shape configuration, as shown in FIG. 1, when it is in position within the blood vessel whose blood flow is to be measured. However, during the insertion into the blood vessel 10, the tubular member 18 is straightened out into a linear configuration so that it may be threaded percutaneously through a hollow catheter into the blood vessel 10, either directly or through the branch vessel 12.

Once the flow meter of the invention is within the blood vessel 10, the resilient metal tubular member 18 assumes its S-shape rectangular or angular configuration, thereby spreading the pick-up electrodes $E_1$ and $E_2$ diagonally or diametrically apart, so that they are disposed transversely with respect to the blood stream passing through the blood vessel 10, and to the magnetic field; and in a diagonal or diametrically opposed relationship across the blood vessel.

As mentioned above, the electrodes $E_1$ and $E_2$ need not contact the inner surface of the wall of the blood vessel, in which case the flow meter operates as a velometer rather than a true volume rate flow meter. The advantage of a diagonal angulation is that the probe will fit, with a slight deformation, a wide range of blood vessel diameters, whereas a rectangular bend requires a more precise fit unless the bent section is smaller than the diameter of the blood vessel in which the probe is inserted.

A magnetic field may be created in the blood vessel 10 in a space encompassing the electrodes $E_1$ and $E_2$ by means, for example, of an electric current ca-rying external coil 16, as shown in FIG. 2. The external coil 16 may have any appropriate configuration to create the desired magnetic field in the blood vessel 10 and it may be positioned, for example, around, under or over the patient. The external coil 16 may be flat and lie directly on the surface supporting the patient, or it may be shaped, for example, as described in the Copending application Ser. No. 873,240, as a cradle. This latter configuration is shown in FIG. 2, and the patient lies directly within the coil in such an instance, as shown in FIG. 3. Smaller coils may be made, and they also may have a cradle-like configuration, so that the arm or leg of the patient may be placed into the coil, when measurements are to be made on the blood vessels within the arm or leg. The coil 16 may also be round and flat, or have any other suitable configuration, and the patient may be above, beside or below the coil. Alternately, two or more coils may be used, and the patient may be sandwiched between them, or any other means for establishing a magnetic field within the blood vessel 10 may be used.

The coil 16 has any desired number of turns, so as to produce the desired magnetic field across the blood vessel 10, as shown in FIG. 4. In FIG. 4, the blood vessel 10 is shown on an enlarged scale as a transverse section. An alternating current is introduced into the coil 16, and the coil thereby generates an alternating magnetic field having a component in the illustrated direction in FIG. 4, symbolized by the vector B across the blood vessel 10, so that the fluid flowing through the blood vessel flows transversely through the magnetic field and develops an alternating current voltage which is picked up by the electrodes $E_1$ and $E_2$. The electrodes $E_1$ and $E_2$ are preferably platinized platinum, or otherwise treated, so as to exhibit non-polarizing characteristics which would eliminate polarization of the electrodes which adversely affects the proper electrical operation of the instrument.

Because of the flexibility and deformability of the flow meter described above, which is essentially a linear type catheter, it may be manuevered into side branches of the arteries, in accordance with standard angiographic practice and thus be able to measure blood flow through the organs supplied by the chosen branch. The diameter of the blood vessel whose flow is being measured must also be known to ascertain the volume flow sensitivity of the transducer. This diameter may be obtained with X-rays by angiographic means, or by the tube 18 showing as a shadow in the X-ray radiogram, and with the transverse dimension of the blood vessel being indicated by the displacement between the laterally most widely displaced sections of the tube, or finally by means of an electromagnetic artery gage such as described in Copending application Ser. No. 873,240.

The system of FIG. 3 shows the manner in which the external coil 16 may be energized from an appropriate alternating current source 50 to which the coil leads $W_1$ and $W_1$ are connected, so that an alternating magnetic field may be produced within the blood vessel, such as the aorta of the patient. The leads $L_1$ and $L_2$ from the pick-up electrodes $E_1$ and $E_2$ supply the resulting alternating current signals to an appropriate detector and amplifier 52, and the amplified output signal from the amplifier 52 is applied, for example, to a recorder 54 so that a record may be made. The alternating current source 50, as well as the detector and amplifier 52 and recorder 54, are well known electrical units and are available commercially. Therefore, it is believed unnecessary to discuss such units in detail herein.

In the operation of the flow meter of the invention, the angulated probe portion is twisted, for example, until the indicated flow signal picked up by the electrodes $E_1$ and $E_2$ is a maximum. The magnetic field generated within the blood vessel should be sufficiently uniform and vary slowly in space in a known manner so as to permit an accurate estimate of its intensity at the location of the probe to be made, without any need for knowing with great precision the exact location of the probe.

In the embodiment of FIG. 5, for example, the electrodes $E_1$ and $E_2$ are formed by winding platinum or other appropriate wires about the insulating coating 14, so that the two electrodes are insulated from the metal tube 18 and from one another. Connections are made to the electrodes through the leads $L_1$ and $L_2$, as shown. A nose 60 may be provided at the end of the tubular member 18 and inserted into the tubular member, as shown. The nose 60 may be formed of a soft material, such a silicon rubber, and it serves to obviate any tendency for the forward end of the instrument to pierce the wall of the blood vessel.

The embodiment of FIG. 6 is generally similar to that of FIG. 5. However, in the latter embodiment, the electrode $E_1$ is wound in electrical contact with the metal tube 18, and the connection to the electrode $E_1$ is made through the metal tube, the lead $L_1$ being connected to the tube, as shown.

In the embodiment of FIG. 7, the soft resilient rubber nose 60 is replaced by an electrically conductive nose 62 which, additionally, serves as the electrode $E_2$ for the assembly. In the latter case, for example, the electrode $E_1$ is connected to the metal tube 18, and connection is made to that electrode through the tube, as in the embodiment of FIG. 6. The lead $L_2$, on the other hand, is connected through the tube to the electrode $E_2$ in a coaxial manner. The electrode $E_2$, as in the previous embodiments, is insulated from the tube and from the electrode $E_1$.

An improved electromagnetic catheter-type flow meter is provided, therefore, which incorporates a linear probe which resiliently shapes itself into a configuration so as to displace its electrodes diagonally across the conduit into which the probe is inserted. If desired, the probe may be processed to assume more complex configurations than those illustrated in the drawings. For example, the probe may assume a sinusoidal shape, and have two or more electrodes, some of which may be connected to one another, or a simpler configuration may be used in which the tube 18 is bent slightly below the electrode $E_1$.

A third electrode $E_3$ may also be mounted on the straight portion of the tubular member 18 in FIG. 1, for example, to the left of the bend, and the electrode $E_1$ itself may lie on the straight portion just to the left of the bend. In either event, the third electrode would be displaced to the left from the electrode $E_1$ in FIG. 1. The signal between the third electrode $E_3$ and $E_1$ may be used to monitor eddy currents and to adjust the coil or patient so as to suppress the eddy current disturbances with respect to flow measurements.

The representation of FIG. 8, as mentioned above, is similar to that of FIG. 1, and like components have been designated with the same numbers. In FIG. 8, however, the resilient metal tubular member 18 of the flow meter is shown as emerging from a hollow catheter C inserted into the blood vessel, and the resilient tubular member 18 assumes a substantially 90° angular configuration as it emerges from the inner end of the tubular catheter C, so that the pick-up electrodes $E_1$ and $E_2$ are spaced diametrically opposite one another within the blood vessel 10, instead of diagonally, as shown in FIG. 1. It will be appreciated, of course, that the tubular member 18 may be preformed to assume any desired angular configuration once it has emerged from the inner end of the tubular catheter C and is within the blood vessel 10. Moreover, the bend may be made at any desired point by the user, so as to establish the ultimate length of the transverse end of the probe.

Figure 9:
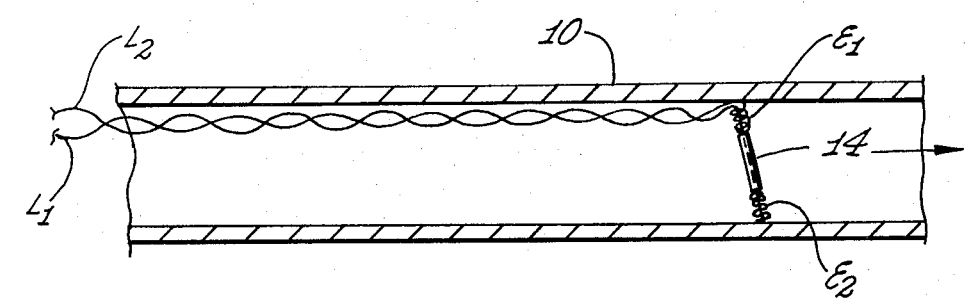
FIG. 9 is yet a further embodiment of the invention.

In the embodiment of FIG. 9, the tubular member 18 is dispensed with, and the flow meter is formed by the leads $L_1$ and $L_2$ which may, for example, be Teflon insulated resilient stainless steel wires, twisted and bonded together. The lead $L_1$ is made somewhat shorter than $L_2$, and the insulation is removed from its right hand end, and that end is coiled around the lead $L_2$ to form the electrode $E_1$. The electrode $E_1$ is insulated from the lead $L_2$ by virtue of the insulation on the latter lead. The bare end of the lead $L_2$ is coiled around its end to form the electrode $E_2$.

The leads $L_1$ and $L_2$ are preformed so that when they are inserted within the blood vessel, for example, through a tubular catheter, they assume the angular configuration shown in FIG. 9, or any other desired angular configuration, as was the case in the previous embodiment. The lead $L_2$ may be reinforced by a dielectric coating 14, so as to bring the diameter of the catheter tip to the order of the thickness of the twisted wire section. The insulation is removed from the remote end of the lead $L_2$, and it may be provided with the illustrated coiled configuration so as to form the electrode $E_2$. Instead of two twisted leads, as shown in FIG. 9, the leads $L_1$ and $L_2$ may be parallel to one another, if so desired.

Figure 10:
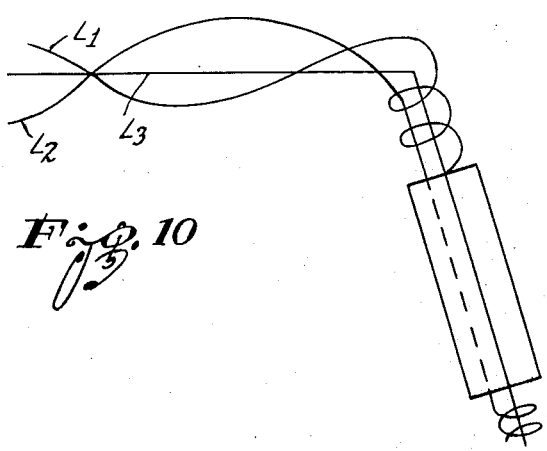
FIG. 10 shows a modification of the FIG. 9 embodiment of the invention.

As an alternative to the construction described above in conjunction with FIG. 9, the leads $L_1$ and $L_2$ may be composed of a flexible material, and a third thin resilient wire $L_3$ (FIG. 10) may extend longitudinally between or next to the wires to cause them to assume the desired resilient characteristics.

An important feature of the flow meter of the present invention is that it may be constructed so as to have a minimal transverse dimension and be capable of straightening for insertion into the patient percutaneously through a hollow catheter tube, or the like, in accordance with the practices which are well established in conjunction with angiography.

It should also be pointed out that although particular types of instruments embodying the invention have been illustrated and described herein, modifications may be made. It is intended in the following claims to cover all such modifications which fall within the spirit and scope of the invention.

I claim:

1. Angiometric probe comprising:
    an elongated deformable member adapted to be inserted into a biological fluid-carrying vessel and having a bend near the end thereof forming at said end an angular portion adapted to extend transversely of the longitudinal axis of the remaining portion of the member across the vessel into which the probe is inserted;
    a first electrically conductive electrode mounted on said member adjacent said bend;
    a second electrically conductive electrode mounted on said angular portion of said member and spaced longitudinally from said first electrode and closer to the end of said member than said first electrode;
    at least a portion of said elongated member in the vicinity of said bend being elastic, so that said bend may be straightened for the insertion of the probe into the vessel, thereafter resuming its angular position when the probe is in position in the vessel, thereby to orient said electrodes transversely of the longitudinal axis of the remaining portion of said member and transversely of the vessel;
    said member including electrically conductive means for making electric connection externally of the vessel to the respective said electrodes.

2. Probe in accordance with claim 1 wherein:
    said elongated member comprises a tube, at least one of said electrically conductive means extending to the exterior of the vessel through the interior of said tube.

3. Probe in accordance with claim 2 wherein:
    said tube is of electrically conductive material, and one of said electrodes includes a portion of said tube exposed electrically to the fluid in said vessel.

4. Probe in accordance with claim 2 wherein:
    said tube is of electrically conductive material, and one of said electrodes is electrically connected to said tube, whereby said tube constitutes one of said electrically conductive means.

5. Probe in accordance with claim 2 wherein at least one of said electrically conductive electrodes is formed of a coil wound around said tube.

6. Angiometric probe adapted to be inserted into a biological fluid-carrying vessel comprising:
    a pair of elongated electric leads forming a deformable member adapted to be inserted into the vessel;
    said deformable elongated member having a bend therein forming an angular portion adapted to extend transversely to the longitudinal axis of the remaining portion of said elongated member and transversely across the vessel;
    said leads being juxtaposed generally parallel to each other, one of said leads being shorter than the other and terminating adjacent said bend;
    means forming a first electrically conductive electrode at the termination of said one lead and electrically connected thereto, the other of said leads forming at least a portion of said angular portion of said elongated member;
    means forming a second electrically conductive electrode at the end of said other lead spaced longitudinally along said angular portion of said elongated member from said first electrode;
    said first electrode being disposed on the side of said bend towards said second electrode and said electrodes residing transversely of the longitudinal axis of the remaining portion of said elongated member when said probe is positioned in the vessel;
    at least a portion of said elongated member in the vicinity of said bend being elastic, so that said bend may be straightened for the insertion of the probe into the vessel, thereafter resuming its angular position when the probe is in position in the vessel, thereby to orient said electrodes transversely of the longitudinal axis of the remaining portion of said member and transversely of the vessel.

7. Probe in accordance with claim 6 including:

a tubular catheter adapted for insertion into the vessel, said elongated deformable member extending through the interior of said catheter and emerging at the inner end thereof.

8. Electromagnetic flow meter comprising the probe claimed in claim 1, and which includes:
   means for creating a magnetic field transversely of a line joining said electrodes; and
   means for measuring the voltage induced across said electrodes by the interaction of said field and the flow of biological fluid in the vessel.

9. Probe in accordance with claim 1 wherein:
   said bend in said deformable elongated member is approximately 90°.

10. Probe in accordance with claim 1 wherein:
   said electrically conductive means comprises a pair of twisted conductors connected respectively to said electrodes.

11. Probe in accordance with claim 6 wherein:
   said juxtaposed electrical leads are twisted together.

* * * * *